No. 622,480. Patented Apr. 4, 1899.
F. E. IVES.
REFLECTOR FOR USE IN PHOTOCHROMOSCOPES, &c.
(Application filed Mar. 1, 1898.)
(Model.)
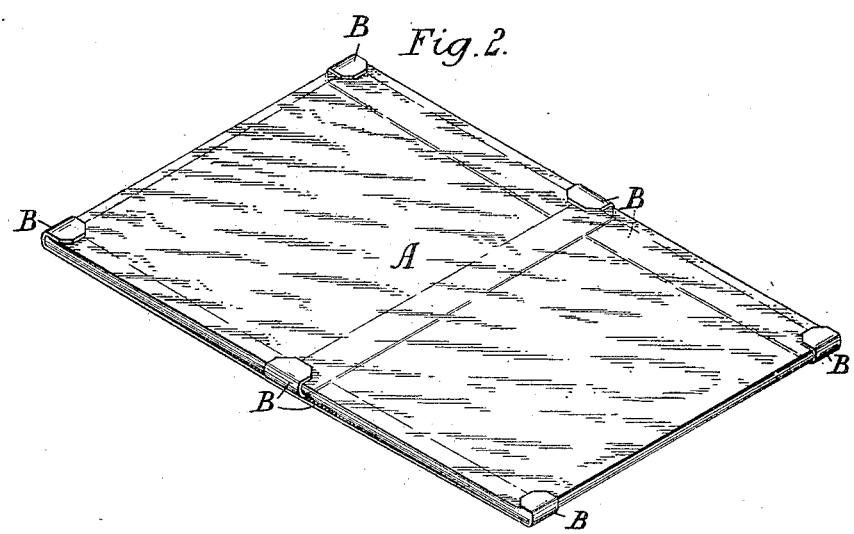
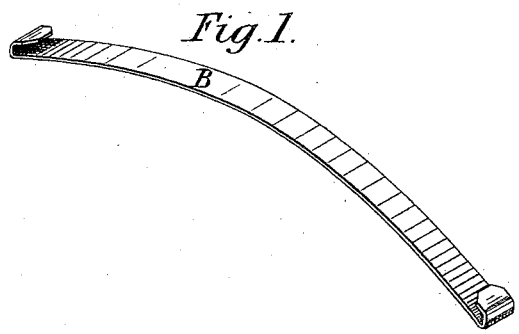
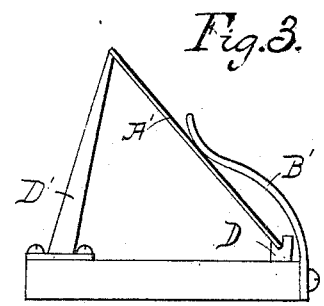
WITNESSES:
F. W. Wright
S. C. Connor
INVENTOR
FREDERIC EUGENE IVES
BY
Howson and Howson
HIS ATTORNEYS

UNITED STATES PATENT OFFICE.

FREDERIC EUGENE IVES, OF PHILADELPHIA, PENNSYLVANIA.

REFLECTOR FOR USE IN PHOTOCHROMOSCOPES, &c.

SPECIFICATION forming part of Letters Patent No. 622,480, dated April 4, 1899.

Application filed March 1, 1898. Serial No. 672,203. (Model.)

*To all whom it may concern:*

Be it known that I, FREDERIC EUGENE IVES, photographer, a citizen of the United States, and a resident of 2750 North Eleventh street, in the city of Philadelphia, State of Pennsylvania, but now at 121 Shaftesbury avenue, in the county of London, England, have invented new and useful Reflectors or Mirrors for Use in Photochromoscopes or other Optical Instruments, of which the following is a specification.

The object of my invention is to provide a simple and ready means of changing the figure of mirror surfaces or reflectors in photochromoscopes or other optical instruments.

In photochromoscopes such as those described in the specification of United States Patent No. 531,040, dated December 18, 1894, granted to me, the inclination of the transparent reflectors necessary to secure an optical superposition of the different images to the eye, owing to the different angles at which different portions of the cone of light enter the surface of the glasses and consequent differences of refraction, causes a distortion of the image seen by the transmitted rays. When the transparent mirrors are inclined in the manner shown in the drawings of the said specification, the image seen by the transmission will, if the glasses have plane parallel surfaces, appear vertically elongated to a slight extent sufficient to prevent all the details of the picture from registering accurately to the eye with the same details in the reflected image. This defect can be corrected by employing glasses which instead of having plane surfaces exactly parallel to each other are slightly wedge-shaped and so disposed that the lowest part of the picture seen through the glass appears optically displaced upward, while the displacement appears less and less toward the top, where the inclination of the transparent mirror brings it closer and closer to the photographic image. The production of suitably-wedged glasses with certainty is, however, difficult and costly, as is also the production of strictly-accurate reflecting-surfaces; and it is the object of my present invention to avoid the necessity for employing such special wedge-shaped glasses and strictly-accurate surfaces by causing springs to bear upon the glasses, the said springs being so made and disposed that they sufficiently distort or alter the figure of the reflecting-surface either in one direction or in both directions sufficiently to cause the reflected image to conform to the transmitted image or images. By this means I am able to greatly cheapen the production of good instruments by utilizing glasses that have been ground and polished by rapid machine processes and which could not otherwise be depended upon to produce sufficiently accurate surfaces to be successfully employed for this purpose.

In the accompanying drawings, Figure 1 is a perspective view of a spring such as I employ. Fig. 2 is a perspective view of a transparent mirror with a series of springs applied thereto, and Fig. 3 is a sectional view illustrating a modification of the invention.

In practice I prefer to employ springs of brass, such as that shown in Fig. 1 of the accompanying drawings, bent at the ends to grasp the glass at the sides or ends, as shown in Fig. 2. A represents the glass, and B the spring. Applied in this way the surface next to the spring, if originally a plane, becomes under the action of the springs slightly cylindrically concave, the amount of concavity depending upon the amount of tension or deflection put into the spring before attaching to the glass. Such springs may be put across one or two sides of the glass or across the middle between the two axes of vision in a stereoscopic photochromoscope, and the correct tension of the springs to secure the desired result is readily found by process of trial and error after a little practice. The springs may afterward be more securely attached by binding with gummed paper or by any other suitable means. I have shown three springs applied one across the middle (for a stereoscopic photochromoscope) and two across the sides at right angles thereto; but one or more of such springs can be used, as may be necessary. It is evident that the same result may be attained by forcing the glasses against rigid stops near the ends by springs bearing upon the face of the glass at an intermediate point, in which case the springs can be held in position without being fastened to the glasses.

A modification of this character is illustrated in Fig. 3, in which A' represents the glass reflector, B' a spring pressing upon the face of the same, and D D' the rigid stops near the edges of the reflector.

Having thus described my invention, I claim and desire to secure by Letters Patent—

1. The combination of a transparent mirror designed to optically blend one image seen by reflection with another image seen by transmission, with a pressure device bearing locally upon said mirror and serving to alter the figure of its reflecting-surface so as to cause accurate superposition of the images.

2. The combination of a transparent mirror designed to optically blend one image seen by reflection with another image seen by transmission, with a pressure device mounted upon and carried by said mirror and bearing locally thereupon whereby it serves to alter the figure of the reflecting-surface of the mirror.

3. The combination of a transparent mirror designed to optically blend one image seen by reflection with another image seen by transmission, with a spring applied to the mirror and having a local bearing thereon, whereby it alters the figure of the reflecting-surface.

In testimony whereof I have signed my name to this specification in the presence of two subscribing witnesses.

FREDERIC EUGENE IVES.

Witnesses:
 WILLIAM FREDERICK UPTON,
 WILLIAM JOHN WEEKS.